UNITED STATES PATENT OFFICE.

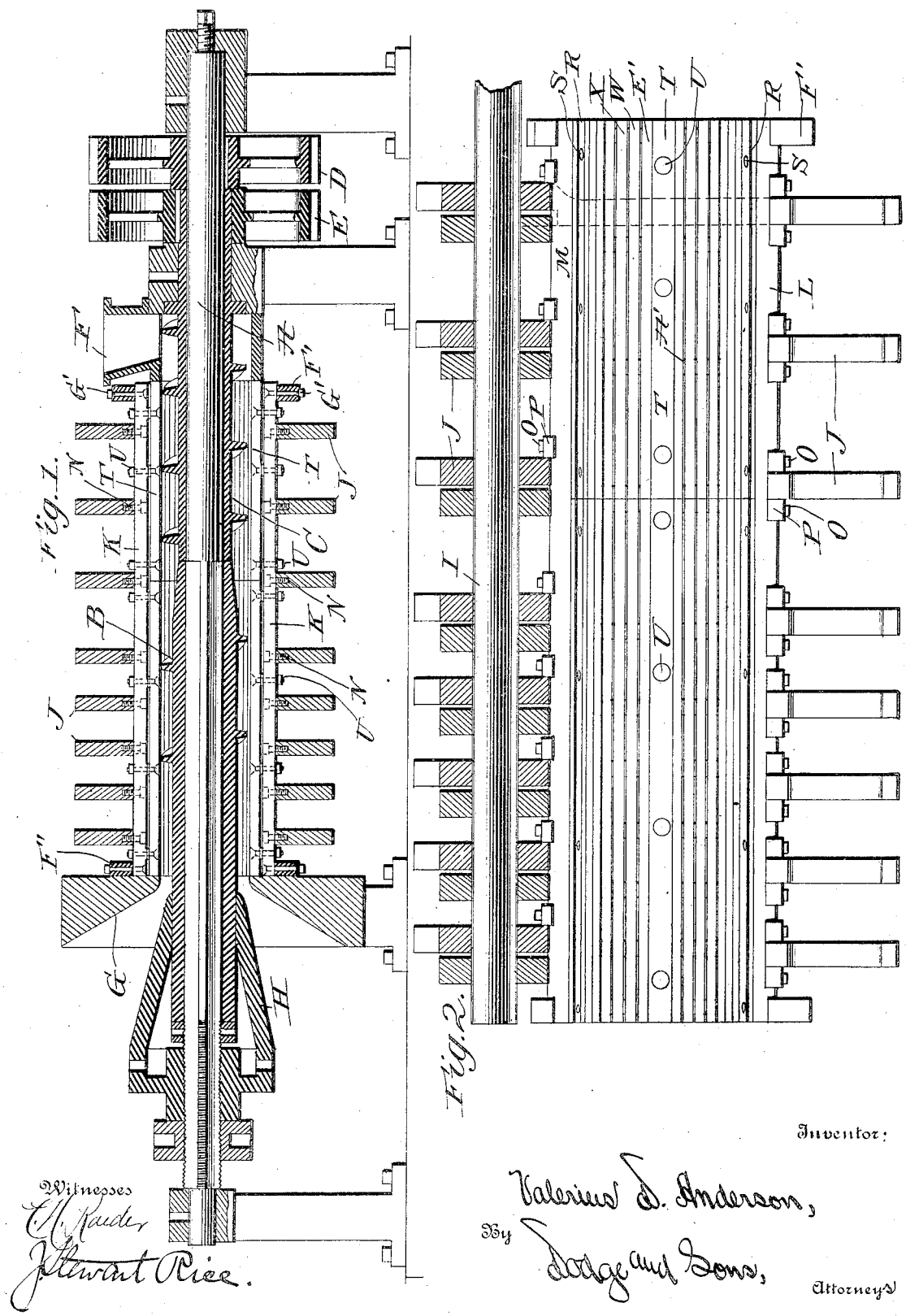

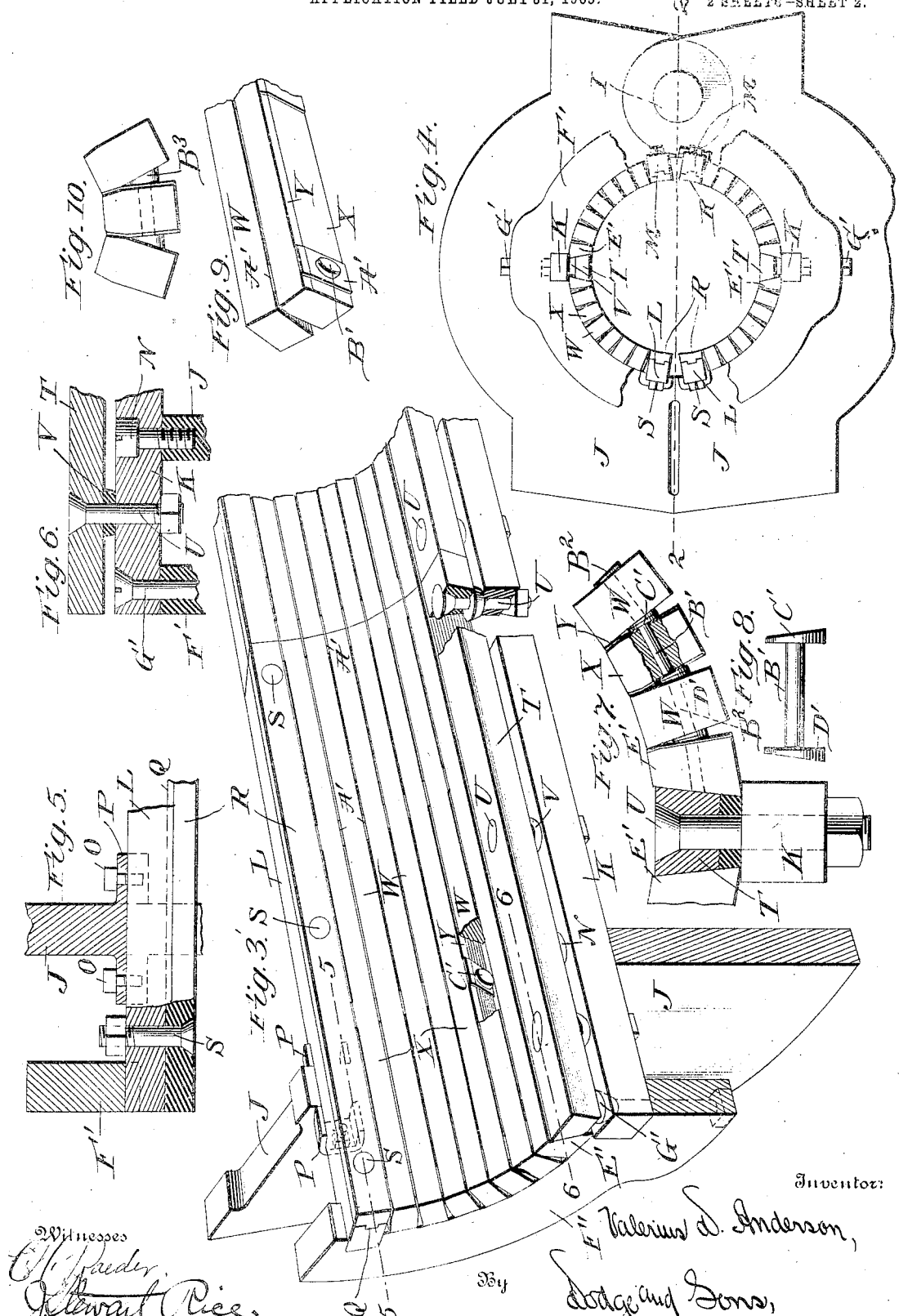

VALERIUS D. ANDERSON, OF CLEVELAND, OHIO; ALBERT D. ANDERSON EXECUTOR OF SAID VALERIUS D. ANDERSON, DECEASED.

PRESS.

No. 829,315. Specification of Letters Patent. Patented Aug. 21, 1906.

Application filed July 31, 1905. Serial No. 272,084.

*To all whom it may concern:*

Be it known that I, VALERIUS D. ANDERSON, a citizen of the United States, residing at Cleveland, in the county of Cuyahoga and State of Ohio, have invented certain new and useful Improvements in Presses, of which the following is a specification.

My present invention pertains to improvements in presses, and relates more particularly to that class of machines which forms the basis of the following Letters Patent of the United States granted to me: No. 647,354, dated April 10, 1900, and Nos. 731,734, 731,735, and 731,737, dated June 23, 1903.

The object of the invention is primarily to provide an improved shell or casing the life of which is materially longer than that of the shell or casing shown in the patents referred to above.

The invention will be best understood upon reference to the accompanying drawings, in which—

Figure 1 is a longitudinal vertical sectional view of the press or expeller; Fig. 2, a horizontal sectional view taken on the line 2 2 of Fig. 4; Fig. 3, a perspective view of a portion of the shell or casing; Fig. 4, an end elevation thereof, parts being broken away; Fig. 5, a detail sectional view on the line 5 5 of Fig. 3; Fig. 6, a similar view on the line 6 6 of Fig. 3; Fig. 7, an end elevation of a portion of the bars, parts being broken away and shown in section to more clearly illustrate the construction; Fig. 8, a detail side elevation of one of the spacing-rivets; Fig. 9, a perspective view of two of the bars; and Fig. 10, an end elevation of three of the bars, showing a slightly-modified form of construction.

The main object of the invention is to provide a shell or casing with a series of openings therein of a predetermined width and to so construct the shell that the openings will remain the same in size as the surface of the shell wears away through the action of the material thereon.

A further object of the invention is to provide a ready means for securing the bars of the shell in their adjusted positions.

A still further object is to provide means for properly spacing the bars and preventing the same from stacking.

Referring to the drawings, and more particularly to Fig. 1, A denotes the main driving-shaft of the press, upon which is mounted a screw section or quill B, which rotates with the shaft. A second screw-section C rotates about the forward end of the shaft, said shaft being driven from a gear D, while screw-section C is driven by a gear E. These screw-sections carry separated screws, as in my former patents, that serve to express the oil from the seed or other material which is fed to the press through a hopper F.

The material which is carried from the shell of the press (which will be hereinafter described in detail) is discharged through a casting or member G and over a conical disintegrating member H, the latter being adjustable toward and from the member G, as will be readily appreciated upon a mere inspection of Fig. 1.

The shell or casing is composed of a series of bars extending longitudinally thereof, the bars being carried by suitable supports hinged upon a shaft or rod I, Figs. 2 and 4, which extends longitudinally of the press and is mounted in suitable boxes or bearings formed in the main castings or frame of the press. Said shell or casing is divided longitudinally into an upper and lower section, one of which may be raised and thrown away from the screws, while the other may be dropped for the same purpose. Both portions or sections of the shell being similar in construction, a description of one will suffice.

J J denote a series of ribs or supporting members, made sufficiently heavy to withstand the enormous pressure which is exerted by the screws in the disintegration and compression of the seeds or other material. These members, as will be seen upon reference to Figs. 1 and 2, are placed parallel to each other and hinged upon the rod I. Adjacent to the discharge end of the press the ribs are brought closer together, inasmuch as the pressure exerted at this point is greater than at the forward or feed end of the press.

The inner face of each rib is substantially semicircular in form and is provided with three notches, one being centrally disposed and adapted to receive a bar or member K, while the other notches are formed adjacent to the extremities of the rib and designed to receive the bars or rods L and M, the latter being identical in form. Bar K is secured in the rib by a tap-bolt N, (see Fig. 1,) while rods L and M are held to the ribs by tap-bolts O, passing through lugs or ears P, extending outwardly from the ribs or members J. (See Figs. 3 and 5.) Each of the bars L and M is likewise provided with a mortise or groove upon its outer face, adapted to receive a tenon or ear Q of a shoe or wearing-face R, said shoe or wearing-face being secured by a series of bolts S, which pass through the shoe and the bar and securely hold the parts in position. The bolts prevent the ear from being withdrawn from the groove, and the groove holds the shoe against sidewise movement under the torsional action of the screw and the material forced around within and through the shell. The means shown for holding the shoe in position permits the ready removal thereof when said member becomes worn through the action of the material passing through the press and also the substitution of a new shoe.

T denotes a wedge-shaped member which is secured to the intermediate bar K by bolts U, passing through said bar or member T and bar K, as best seen in Figs. 3, 6, and 7. A washer V, of a material which may be slightly compressed under heavy pressure, is introduced between the lower face of member T and the bar K, said member T acting, in conjunction with the fixed bars L and M, to properly position the intermediate bars and to firmly clamp them in their proper position.

The intermediate bars, as shown in Figs. 1, 2, 3, 4, 7, and 9, comprise a series of bars W, rectangular in cross-section, and a second series X, the inner edges of which latter are slightly beveled, the faces Y (see Figs. 7 and 9) standing in parallelism with the side faces of said rectangular bars W when the parts are assembled. It will, therefore, be seen that so long as the bars are properly spaced and held in exact adjustment the openings between the bars will remain the same until the bars wear down beyond the beveled faces Y.

It is essential to the proper operation of a press of this character that the spaces between the bars be the same throughout and that the spaces should remain the same so long as the press is in operation. By providing each alternate bar with a beveled face, as just noted, the spacing will be constant for a long period, and the length of time during which the bar may be used is proportionately extended.

It is not material in the operation of the press that the separated screws should come into contact with the material, so that the screws and the inner face of the shell may wear away to a considerable extent, before the press becomes inoperative for the purpose of extracting oil or other liquid.

In order to properly space the bars, there is secured upon the opposite faces of each alternate bar a flat member A', preferably formed of a piece of clock-spring or like hard material, said members extending to the upper edge of the bar and being secured in position by a rivet B', which passes through said members and the bar. To prevent the bars from stacking under the action of the material in the press, the rivets are preferably formed as shown in detail in Figs. 7 and 8—that is to say, they have a wedge-shaped head C' and are formed with a similar head D' upon the opposite end. Similar rivets B² are passed through each of the bars W, the heads of said rivets abutting with the heads C' D' of the rivets in the bars X. It is conceivable, of course, that a washer of the form shown may be employed instead of a long rivet having what may be termed a "second head" thereon. The bars being thus properly spaced at their inner edges and likewise held a fixed distance apart by the rivets, all stacking of the same is prevented. The bars W are likewise prevented from moving inward, as they might otherwise do, were they not provided with bevel-headed rivets.

With the construction shown it is only necessary to loosen the wedge-shaped member T and insert the bars W and X in alternation. Then by drawing said member T downwardly it acts upon the beveled faces of the immediately adjacent bars E', which, as is seen upon reference to Figs. 3 and 7, must be of special form, thus serving to force the bars against the rivet-heads and also against the ends of the spacing members A' and against the fixed shoes R, whereby all the bars will be securely held in position and uniformly spaced throughout.

The outer ends of the bars W and X and also the bars or members K, L, and M are preferably supported upon a casting or frame F'. (See Figs. 3, 4, 5, and 6.) Bar K is secured to said member by a bolt G'.

Instead of beveling the face of each alternate bar it is conceivable that the outer faces of each bar may be beveled, as shown in Fig. 10. With this construction it is only necessary to employ the rivets B³ upon each alternate bar, as the beveled faces preclude the inward movement of any of the bars.

New bars may be readily substituted when necessary by simply loosening the wedge-shaped member T, which will permit the ready withdrawal of any or all of the bars. Another shoe may then be applied to each of the bars L and M at the same time or when it becomes desirable to change the shoes for any reason.

Inasmuch as the wear is greater in the final or discharge end of the press than in the forward end thereof, it is found desirable to employ two sets of bars in forming the shell—that is to say, the bars do not extend throughout the length of the shell or are made in two sections, as is clearly indicated in Figs. 1, 2, and 3. It is conceivable that the bars may be made shorter, and in practice I have employed a shell formed of four lengths of bars.

The shorter bars are easier to straighten and cost less to replace.

By providing the bars with beveled edges or faces close adjustment thereof at their inner portions may be secured and at the same time a wide or divergent space is produced between the remaining portion of the adjacent bars, through which the liquid expressed from the material undergoing treatment may freely pass. In other words, the gradually-increasing space forms an opening which is not liable to become clogged.

Having thus described my invention, what I claim is—

1. A shell for a press, comprising a substantially circular series of metallic bars, said bars being separately formed and secured together with their side faces in parallelism throughout those portions which lie adjacent to the interior of the shell.

2. A shell for a press, comprising a series of bars arranged side by side, the adjacent faces of said bars at their inner portions standing parallel to each other while the remainder of the space between each pair of bars gradually increases toward the outer faces of the bars.

3. A shell for a press, comprising a series of bars, said bars being substantially rectangular in cross-section and each alternate bar having those faces which are adjacent to the next bars slightly beveled so that said beveled portions stand parallel to the next adjacent bars.

4. A shell for a press, comprising a series of radially-arranged bars, said bars being placed side by side and having a space or opening of a definite width between the inner edges of each pair of bars, said space projecting inwardly between the bars to a limited extent while the bars are separated a greater distance throughout the remainder of their side faces, substantially as described.

5. A bar for the shell or casing of a press, provided with inwardly-beveled side faces adjacent to its inner edge.

6. A bar for the shell or casing of a press, said bar being substantially rectangular in cross-section and provided with inwardly-beveled faces extending throughout its length adjacent to the inner edge thereof.

7. A shell or casing for a press, comprising a series of bars the adjacent faces of said bars at their inner portions standing parallel to each other; a series of spacing members secured to the bars and adapted when the bars are assembled to separate the inner edges thereof to a predetermined extent; and means for preventing the bars from stacking when the same are secured in position.

8. In combination with a supporting member having a curved face; a series of bars mounted thereon; means for spacing the bars at their inner edges; means independent of the spacing means for preventing the bars from stacking; and means for securing the bars in position upon said supporting member.

9. A shell or casing for a press, comprising a series of supporting members having curved bearing-faces; a fixed bar extending throughout the series of supporting members; a second fixed bar carried by said members; a series of loose bars; means for properly positioning said bars with reference to each other; and a wedge-shaped member adapted to act upon one of the outer bars of the loose series, whereby said bars are forced against the first-mentioned fixed bar and against the positioning means.

10. In a press, the combination of a series of semicircular ribs or supporting members, each of said members being provided with three notches or recesses, one of which is located at the mid-length of said rib while the others are formed adjacent to the outer faces of the rib; a bar mounted in each of said notches or recesses; a removable shoe secured to one face of each of the bars mounted in the outer recesses; a wedge-shaped member secured to the intermediate bar; and a series of loose bars resting upon the ribs intermmediate the wedge-shaped member and the outer bars, substantially as described.

11. In a press, the combination of a series of semicircular ribs or supporting members, each of said members being provided with three notches or recesses, one of which is located at the mid-length of said rib while the others are formed adjacent to the outer faces of the rib; a bar mounted in each of said notches or recesses; a removable shoe secured to one face of each of the bars mounted in the outer recesses; a wedge-shaped member secured to the intermediate bar; a series of loose bars resting upon the ribs intermediate the wedge-shaped member and the outer bars; and means for securing the proper spacing of the bars as they are locked in position.

12. A bar for the shell of a press or the like, said bar having beveled faces adjacent to its inner edge, spacing members arranged upon the outer faces of the bar, and a rivet passing through said spacing members, the rivet being provided with a beveled head upon each end.

In testimony whereof I have signed my name to this specification in the presence of two subscribing witnesses.

VALERIUS D. ANDERSON.

Witnesses:
CHAS. S. COLLINS,
A. D. ANDERSON.